United States Patent [19]
Day et al.

[11] Patent Number: 6,122,723
[45] Date of Patent: Sep. 19, 2000

[54] SWITCHING MULTI-INITIATOR SCSI DEVICES TO A SINGULAR TARGET BUS

[75] Inventors: Kenneth Glenn Day; Donald Eugene Denning; Robert George Emberty; Craig Anthony Klein; David Dale McBride; Edward Joseph Pawlowski, all of Tucson, Ariz.

[73] Assignee: International Business Machines Corporation, Armonk, N.Y.

[21] Appl. No.: 09/137,082

[22] Filed: Aug. 20, 1998

[51] Int. Cl.[7] ................................................ G06F 15/00
[52] U.S. Cl. .................................................. 712/29; 710/21
[58] Field of Search ................................ 710/21, 36, 40, 710/240; 711/114; 712/29

[56] References Cited

U.S. PATENT DOCUMENTS

| | | | |
|---|---|---|---|
| 5,239,632 | 8/1993 | Larner | 395/325 |
| 5,257,391 | 10/1993 | DuLac et al. | 395/800 |
| 5,289,589 | 2/1994 | Bingham | 710/128 |
| 5,367,647 | 11/1994 | Coulson et al. | 395/325 |
| 5,465,251 | 11/1995 | Judd | 370/54 |
| 5,596,727 | 1/1997 | Literati et al. | 395/281 |
| 5,740,386 | 4/1998 | Miller et al. | 395/308 |
| 5,745,795 | 4/1998 | Pecone et al. | 395/882 |
| 5,802,289 | 9/1998 | Oprescu | 709/248 |
| 5,802,333 | 9/1998 | Melvin | 710/131 |
| 5,925,120 | 7/1999 | Arp | 710/131 |
| 5,991,824 | 11/1999 | Strand | 710/1 |

*Primary Examiner*—Eric Coleman
*Attorney, Agent, or Firm*—John H. Holcombe; Robert M. Sullivan

[57] ABSTRACT

Disclosed are a switching system and method for a Small Computer System Interface (SCSI). The SCSI has a plurality of ports coupled to devices having differing priorities including a highest priority (initiator) and lower priorities (targets). The present invention interconnects a plurality of the highest priority initiator devices to the lower priority target devices. A plurality of analog switches are each coupled to one of the initiator device ports and to the lower priority target device ports, preferably on a singular target bus, for selectively interconnecting the coupled initiator device to the lower priority target device ports. A controller is coupled to the initiator devices and to the plurality of analog switches, and is responsive to requests for connection from the initiator devices for arbitrating amongst the initiator devices to operate the analog switches to interconnect only one of the initiator device ports to the lower priority target device ports.

17 Claims, 3 Drawing Sheets

| | TARGET ID 61 | LUN 62 | QUEUE TAG 63 | INITIATOR PORT ID 64 | RESERVED STATUS 65 | CONTINGENT ALLEGIANCE STATUS 66 |
|---|---|---|---|---|---|---|
| 60 → | T0 | D05 | N | P1 | Y | N |
| | T1 | D08 | N | P3 | N | Y |
| | T2 | D11 | Y | P2 | N | N |
| | T3 | D16 | N | P8 | N | N |
| | T4 | D12 | N | FREE | N | N |
| | ○ | ○ | ○ | ○ | ○ | ○ |

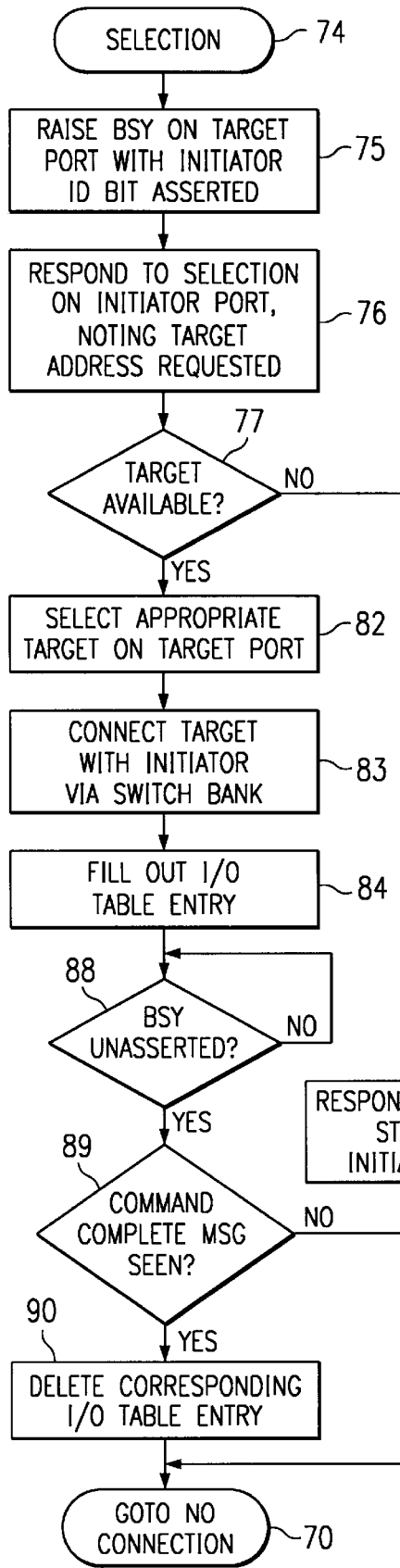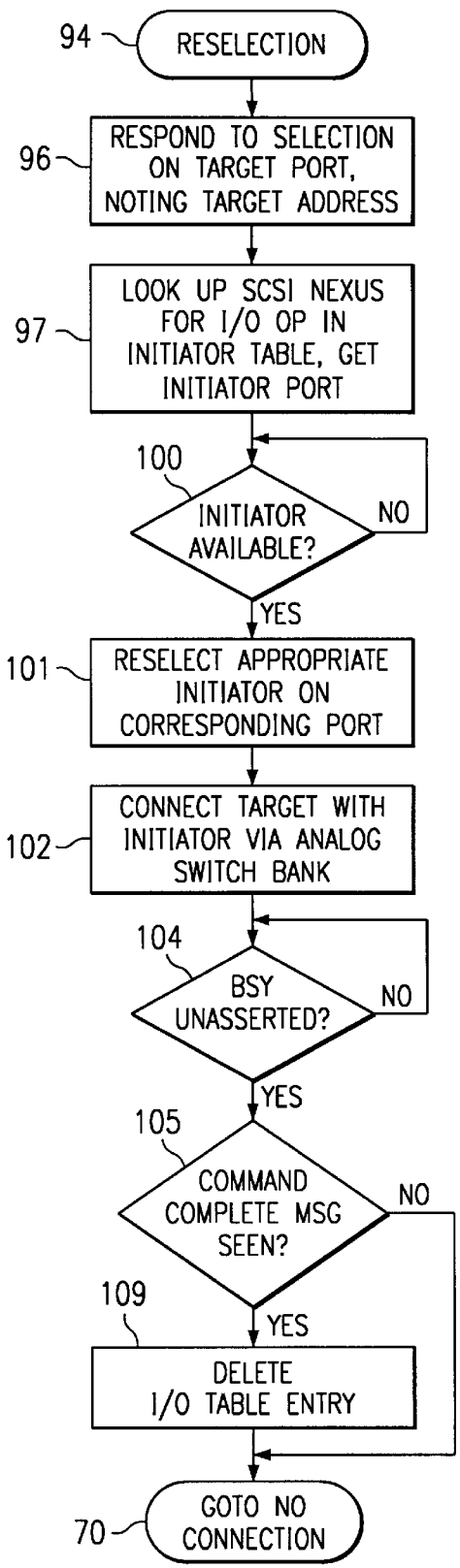
FIG. 5
FIG. 6

SWITCHING MULTI-INITIATOR SCSI DEVICES TO A SINGULAR TARGET BUS

TECHNICAL FIELD

This invention relates to Small Computer System Interfaces (SCSI), and, more particularly, to interconnecting additional initiator devices to target devices with the SCSI interface, exceeding that allowed by the standard SCSI addressing.

BACKGROUND OF THE INVENTION

The Small Computer System Interface (SCSI) is a standard an communications interface having defined electrical and logical to protocol specifications. SCSI allows the interconnection of up to 16 devices on a bus, having differing priorities for access and control of the bus. Typically, a host, which may comprise a computer, such as an IBM RS/6000 or an IBM PC (via a host adapter card), is given the highest priority, limited to one device port, called an initiator and identified by a signal "7", while the peripheral devices are given the remaining lower priorities, called targets and identified by signals "0"–"6" and "8"–"15". The computer uses the bus to interconnect to several target peripheral devices, such as data storage devices, including disk drives, tape drives, etc.

As such, SCSI has become the industry standard for many workstations and their peripherals. However, it is often desirable to allow multiple users and therefore multiple hosts to access common data as stored in peripheral data storage, for example, as a common server system. In one example, such server systems employ a peripheral data storage subsystem, called RAID (Redundant Array of Inexpensive Disks), which provides high speed and fault tolerant access to data stored on a plurality of disk drives. Specifically, the data is stored in a redundant fashion on a plurality of disk drives, so that, should one disk drive fail, the data may still be accessed. In many instances, the disk drives may be accessed in parallel, or may have a solid state memory allowing accumulation of the data, allowing high speed access to the data.

The limitation of the SCSI to a single highest priority initiator device effectively prohibits equal opportunity for access to the common data. Instead, any additional hosts must have lower priorities, and therefore will always be superseded by higher priority hosts. In the case of high rates of access by higher priority hosts, the lower priority hosts may have difficulty gaining access to the common data.

SUMMARY OF THE INVENTION

It is an object of the present invention to provide SCSI access by a plurality of initiator devices at the same priority.

Disclosed are a switching system and method for a Small Computer System Interface (SCSI). The SCSI has a plurality of ports coupled to devices having differing priorities including a highest priority (initiator) and lower priorities (targets). The present invention interconnects a plurality of the highest priority initiator devices to the lower priority target devices. A plurality of analog switches are each coupled to one of the initiator device ports and to the lower priority target device ports, preferably by arranging the lower priority device ports on a singular target bus, for selectively interconnecting the coupled initiator device to the lower priority target device ports. A controller is coupled to the initiator devices and to the plurality of analog switches, and is responsive to requests for connection from the initiator devices for arbitrating amongst the initiator devices to operate the analog switches to interconnect only one of the initiator device ports to the lower priority target device ports.

As an additional aspect of the present invention, during the operation of the analog switches to interconnect one of the initiator device ports, a busy signal is supplied to the port of any other of the initiator devices requesting the connection.

In another aspect of the present invention, the controller additionally comprises a table, the table having an entry for each of the target devices, the entry indicating the port ID (identifier) and the LUN (logical unit number) of the target device. The entry is updated by the controller to indicate the port ID of the one of the initiator devices interconnected to the singular target bus under a request for the target device of the entry, otherwise the entry is updated to indicate that the target device is free.

Further, the initiator devices may Reserve or have a Contingent Allegiance with one of the target devices. The controller additionally updates the table entry for each target device to indicate the port ID of the one of the initiator devices Reserving the target device, or having a Contingent Allegiance therewith, and additionally posts the Reserved or Contingent Allegiance in the entry.

Additionally, the initiator devices may queue additional transactions at the target devices, the additional transaction requiring interconnection between the queuing initiator device and the target device. The controller additionally updates the table entry for each target device to indicate the port ID of the one of the initiator devices queuing the target device, and posts the queuing in the entry.

For a fuller understanding of the present invention, reference should be made to the following detailed description taken in conjunction with the accompanying drawings.

BRIEF DESCRIPTION OF THE DRAWINGS

FIG. 3 is an illustration of a table of the switching system controller of FIG. 2; and FIGS. 4, 5 and 6 are flow charts depicting an embodiment of the method of operating the switching system of FIGS. 1, 2 and 3 in accordance with the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
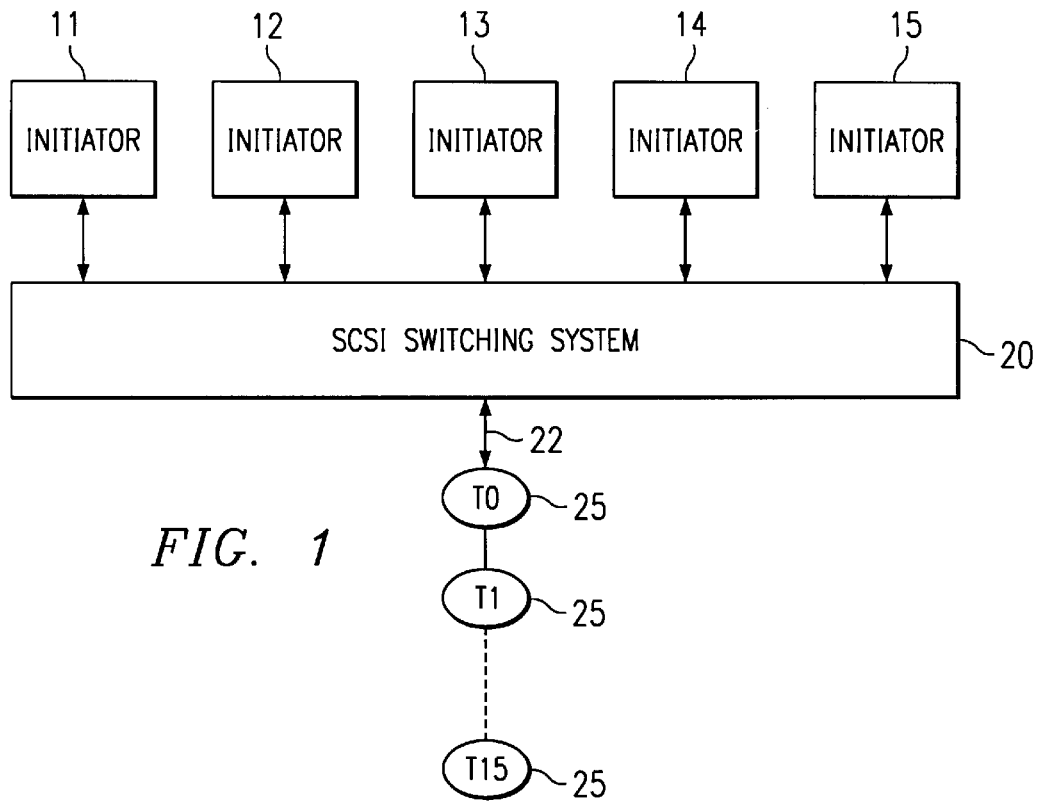
FIG. 1 is a block diagram representation of an embodiment of a switching system in accordance with the present invention with multi-initiators and a plurality of target devices.

Referring to FIG. 1, in one embodiment of the present invention, multiple initiators 11–15 are shown coupled to a SCSI switching system 20. The initiators 11–15 may each comprise a host computer system, such as an IBM RS/6000 or an IBM PC (via a host adapter card), coupled to a SCSI port. In accordance with the present invention, the initiators each are given the identical highest SCSI priority, which is identified by a signal go "7" As discussed above, in the conventional SCSI bus, only one device may be allocated any one priority. In accordance with the present invention, each initiator device 11–15 may consider itself the only device on the bus at the highest priority, as per SCSI requirements. The switching system 20 is in turn coupled to a singular bus 22 which is coupled to a plurality of ports each having a peripheral device 25. The peripheral devices 25 are given the remaining lower priorities, called targets and identified by signals "0"–"6" and "8"–"15". As an example, peripheral devices 25 may comprise disk drives or "direct access storage devices" (DASD) arranged for example as a DASD "farm" or arranged in a RAID configuration, as discussed above. In accordance with the present invention and with SCSI requirements, each of the target devices 25 considers that there is only one highest priority initiator device on the bus 22.

Thus, the SCSI has a plurality of ports coupled to devices having differing priorities including a highest priority (initiator) and lower priorities (targets). The present invention interconnects a plurality of the highest priority initiator devices 11–15 to the lower priority target devices 25.

Figure 2:
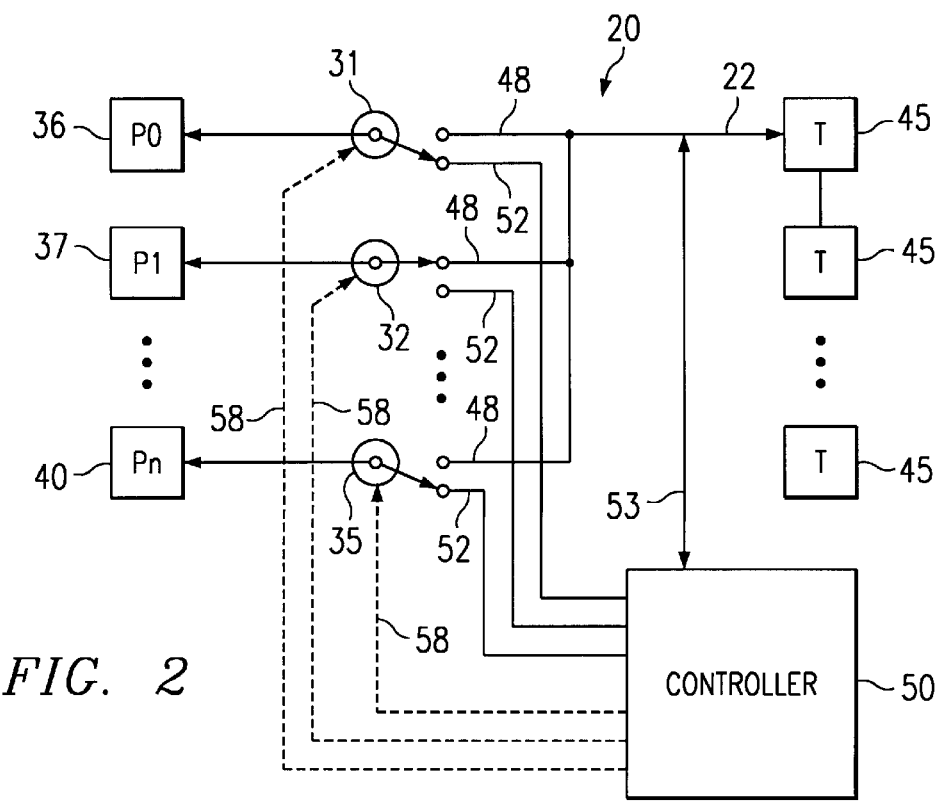
FIG. 2 is a diagrammatic representation of the switching system of FIG. 1.

An embodiment of the SCSI switching system 20 of the present invention as shown in FIG. 1 is shown in greater detail in FIG. 2. A plurality of analog switches 31–35 are each coupled to one of the initiator devices 11–15 of FIG. 1 at ports 36–40, and are each coupled to the lower priority target devices 25 of FIG. 1 at ports 45, preferably arranged on the singular target bus 22 of FIG. 1. The analog switches 31–35 selectively interconnect one of the coupled initiator device ports 36–40 to the lower priority target device ports 45.

In accordance with SCSI requirements, a SCSI bus typically includes cables of 27 wires. Thus, each of the analog switches 31–35 comprises a ganged group of FET switchable transistor circuits, one for each line of the SCSI bus initiator device ports. Each of the FET switchable transistors of each of the analog switches 31–35 are switchable between an "open" condition and a "closed" condition coupling to bus 48 which is coupled via singular bus 22 to the lower priority target device ports 45.

The analog switch FET switchable circuits may comprise any conventional single pole double throw (SPDT) switch, such as a Philips Semiconductor SA630 SPDT switch. Analog switches are intended for analog signals and are employed in accordance with the present invention because of their low resistance and lack of significant noise. Other switches, such as multiplexors and relays, are relatively noisy and slower.

Still referring to FIG. 2, in accordance with one embodiment of the present invention, a controller 50 is coupled to the initiator devices 11–15 of FIG. 1 via ports 36–40 at "open" connections 52 of the analog switches 31–35 and at a bus 53 which is connected to "closed" bus 48. Thus, whether an initiator device 11–15 is coupled by the associated analog switch to the singular bus 22 or is unconnected and the switch is in the "open" condition, the output of the initiator device is coupled to the controller 50. The controller 50 identifies the initiator device by the one of the busses 52 on which the signals occur. As will be described, the controller 50 has an indication of the one of the initiator devices that is coupled to the bus 48, either because of the controller's operation of the analog switch or because of the fact that the analog switch is in the "closed" condition without any connection to the associated bus 52. Thus, each initiator device 11–15 provides signals as though it is the only device having the initiator highest priority.

The controller 50 is additionally coupled to the plurality of analog switches 31–35 by means of control lines 58 for operating the switches.

The controller 50 is responsive to requests for connection from the initiator devices 11–15 for arbitrating amongst the initiator devices to operate the analog switches to interconnect only one of the initiator device ports 36–40 to the lower priority target device ports 45.

Specifically, the initiator devices may each provide signals at the associated ports 36–40 requesting connection to any one of the target devices 25 of FIG. 1. In FIG. 2, the requests from the initiator devices at ports 36 and 37 are transmitted to the controller 50 via switches 31 and 35, respectively, and via busses 52. The initiator device at port 37 may be communicating with a target device via switch 32 and bus 48, but may additionally request another connection to the same or another target device. That request is transmitted to the controller 50 via switch 32, bus 48 and bus 53. As will be explained, the controller 50 waits for the communication by the initiator device at port 37 to complete in accordance with the SCSI protocol, e.g., a signal on the "BSY" or busy line is dropped, and then operates analog switch 32 from the "closed" condition to the "open" condition, arbitrates among all the received requests to select one initiator device—target device connection, and operates the analog switch 31–35 coupled to the port 36–40 of the selected initiator device. The arbitration among initiator devices may be by any suitable means, such as by a preprogrammed priority order.

The controller 50 may comprise a conventional field programmable gate array, which may be customized by being loaded by means of an EPROM, for example.

Figures 3, 4:
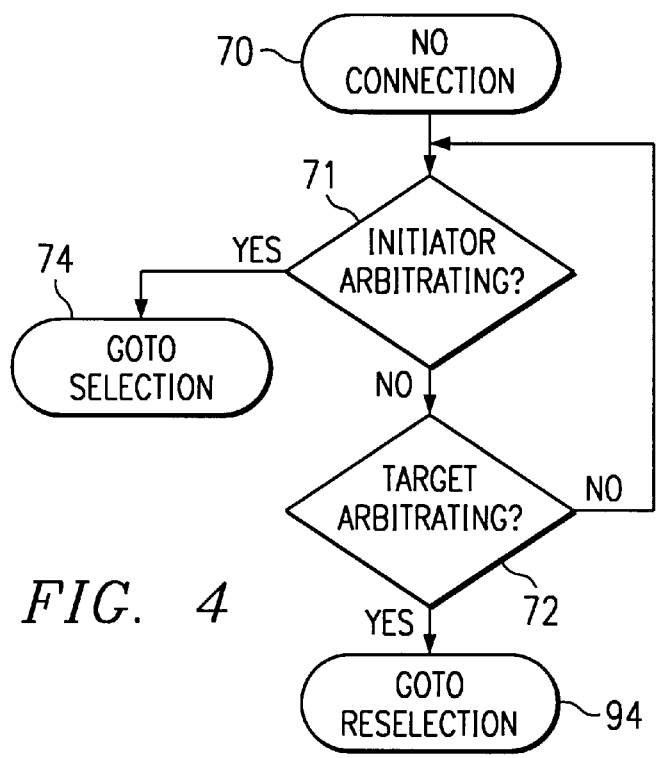

Referring to FIG. 3, in accordance with the present invention, the controller 50 of FIG. 2 is provided with a table 60 for tracking the target devices and any continuing nexus relationships with the initiator devices. For example, under SCSI protocol, the initiator device typically releases the target device and disconnects after issuance of a command which requires some time for the target device to complete, with the expectation that, upon completion of the command, the target device will communicate back to the initiator device. In SCSI protocol, this situation is called "queuing". Additionally, if the target device has an error while transferring data, communication with the initiator device may cease and an error status reported, but the target device will subsequently report back with an error message to the initiator device. In SCSI protocol this is called "Contingent Allegiance". Further, an initiator device may "Reserve" a target device so that a sequence of commands and/or data transfer may occur between the initiator device and the target device.

In table 60, the controller 50 keeps track of each of the target devices, and thereby allows the initiator devices to follow normal SCSI protocol and disconnect from the target devices. The table establishes the initiator device with which a target device has one of the relationships described above, establishing a nexus therewith, and indicates the nature of the relationship. Thus, for example, when a target device requests connection to a highest priority initiator device under the SCSI assumption that only one such device is on the bus, the controller 50 identifies the specific one of the initiator devices from the table 60.

In one embodiment of table 60 illustrated in FIG. 3, the table is arranged with the "ID" or identifying code of the target (which may comprise the target priority identifier) in column 61 and the "LUN" or logical unit number of the target device in column 62. An initiator device may be queuing the target device, as described above, and the queue tag (which may comprise a "1" bit) is provided in column 63 and the port ID of the initiator device doing the queuing is provided in column 64. Similarly, the Reserved status is provided in column 65 and the Contingent Allegiance status is provided in column 66, and the port ID of the initiator device associated with the Reserved status or the Contingent Allegiance status is provided in column 64. A target device having no initiator port ID in column 64 is designated as " free" and may be the subject of communication by any initiator device.

Each of the target devices is given a specific priority under SCSI protocol and this priority also is the identifier of the target device. Thus, the controller 50 responds to the provided priority to identify the target device in column 61. The one of the tags or status bits in columns 63, 65 or 66 indicates the purpose of the request by the target device and column 64 identifies the one of the initiator devices which has established a nexus with the target device and with which the communication is to be resumed.

Therefore, the controller 50 arbitrates the request by the target devices, for example, by the same arbitration as between the associated initiator devices, and reselects the initiator device requested by the target and operates to the "closed" condition the analog switch 31–35 of FIG. 2 that is coupled to the port 36–40 of the reselected initiator device. Alternatively, the arbitration may be based on an ordering of priority of queuing, Reserved, and Contingent Allegiance status.

An embodiment of the method of the present invention is illustrated in FIGS. 4, 5 and 6, beginning at "no connection" step 70 in FIG. 4. Step 71 checks whether requests are received from initiators for arbitration, and, if not, step 72 checks whether requests are received from targets for arbitration. If not, the method loops back to step 71.

Upon receipt of requests from initiators for arbitration, step 71 conducts the arbitration, selecting an initiator device, and goes to step 74 of FIG. 5. In step 75, controller 50 raises the busy line and asserts the highest priority initiator bit on bus 22 of FIG. 2 for the target ports 45. Next, in step 76, controller 50 responds to the selection, noting the target address requested on bus 52 to the initiator ports 36–40 of the initiator devices. Step 77 determines whether the target device is available. If not, step 80 responds with a busy status on bus 52 to the initiator port, and step 70 returns to the no connection of FIG. 4.

If the target device is available in step 77, the appropriate target is identified in step 82 and the appropriate analog switch 31–35 of FIG. 2 is operated to the "closed" condition in step 83. In step 84, the entry in table 60 of FIG. 3 for the target device is updated.

While the communication is completed between the selected initiator device and the target device, step 88 monitors the bus 22 for the BSY to be unasserted, or dropped. When BSY is dropped, step 89 detects whether the SCSI command complete message has been received from the initiator device. If not, step 70 returns to the no connection of FIG. 4. If the command complete message has been received, the controller 50, in step 90, deletes the entry in table 60 of the target device, inserting the "free" designation and goes to the no connection of FIG. 4.

Referring again to FIG. 4, if the controller 50 in step 72 conducts the target arbitration, selecting an initiator device designated by a target device, and goes to step 94 of FIG. 6 for reselecting the initiator device.

Referring to FIG. 6, in step 96, controller 50 responds to the selection, noting the target address requested on bus 48 to the singular bus 22 and the target ports 45. Next, in step 97, controller 50 looks up the initiator device nexus for the target device in the table 60 of FIG. 3. Step 100 determines whether the initiator is available and loops until it becomes available. When the initiator becomes available, step 101 reselects the appropriate initiator device at the appropriate port 36–40 of FIG. 2 and accordingly controller 50 operates the appropriate analog switch 31–35. While the communication is completed between the reselected initiator device and the target device, step 104 monitors the bus 22 for the BSY to be unasserted, or dropped. When BSY is dropped, step 105 detects whether the SCSI command complete message has been received from the initiator device. If not, step 70 returns to the no connection of FIG. 4. If the command complete message has been received, the controller 50, in step 109, deletes the entry in table 60 of the target device, inserting the "free" designation and goes to the no connection of FIG. 4.

Alternative arrangements for the methodology of FIGS. 4, 5 and 6 may be envisioned by those of skill in the art, as may alternative arrangements for the table of FIG. 3.

While the preferred embodiments of the present invention have been illustrated in detail, it should be apparent that modifications and adaptations to those embodiments may occur to one skilled in the art without departing from the scope of the present invention as set forth in the following claims.

We claim:

1. An interface switching system for a Small Computer System Interface (SCSI), said SCSI having a plurality of ports coupled to devices having differing priorities including a highest priority (initiator) and lower priorities (targets), for interconnecting a plurality of said highest priority initiator devices to said lower priority target devices, comprising:

a plurality of analog switches, each said analog switch coupled to one of said initiator device ports and to said lower priority target device ports, for selectively interconnecting said coupled initiator device to said lower priority target device ports; and a controller coupled to said initiator devices and to said plurality of analog switches, responsive to requests for connection from said initiator devices for arbitrating amongst said initiator devices to operate said analog switches to interconnect only one of said initiator device ports to said lower priority target device ports.

2. The interface switching system of claim 1, wherein said controller, during said operation of said analog switches to interconnect one of said initiator device ports, additionally supplies a busy signal to said port of any other of said initiator devices requesting said connection.

3. The interface switching system of claim 2, wherein each of said ports has an ID, wherein each of said devices has a LUN, wherein said requests of said initiator devices identifies a specific one of said target devices or ports, and wherein said controller additionally comprises a table, said table having an entry for each of said target devices, said entry indicating the port ID and LUN of said target device, said entry updated by said controller to indicate the port ID of the one of said initiator devices interconnected to said lower priority target device ports under a request for said target device of said entry, otherwise said entry is updated by said controller to indicate said target device is free.

4. The interface switching system of claim 3, wherein said initiator devices may Reserve or have a Contingent Allegiance with one of said target devices, and wherein said controller additionally updates said table entry for each said target device to indicate the port ID of the one of said initiator devices Reserving said target device, or having a Contingent Allegiance therewith, said controller additionally posting said Reserved or Contingent Allegiance in said entry.

5. The interface switching system of claim 3, wherein said initiator devices may queue additional transactions at said target devices, said additional transaction requiring interconnection between said queuing initiator device and said target device, and wherein said controller additionally updates said table entry for each said target device to indicate the port ID of the one of said initiator devices queuing said target device, said controller additionally posting said queuing in said entry.

6. The interface switching system of claim 3, wherein said initiator device ports comprise a plurality of lines, and wherein each said analog switch comprises a ganged group of FET switchable transistor circuits, one for each line of said initiator device ports, each said FET switchable transistor circuit switchable between an open condition and a closed condition coupling to said lower priority target device ports.

7. A Small Computer System Interface (SCSI) switching system, said SCSI having a plurality of ports coupled to devices having differing priorities including a highest priority (initiator) and lower priorities (targets), for interconnecting a plurality of said highest priority initiator devices to said lower priority target devices, comprising:
a singular target bus coupling all said target device ports;
a plurality of analog switches, each said analog switch coupled to one of said initiator device ports and to said singular target bus, for selectively interconnecting said coupled initiator device to said lower priority target device ports; and
a controller coupled to said initiator devices and to said plurality of analog switches, responsive to requests for connection from said initiator devices for arbitrating amongst said initiator devices to operate said analog switches to interconnect only one of said initiator device ports to said singular target bus.

8. The interface switching system of claim 7, wherein said controller, during said operation of said analog switches to interconnect one of said initiator device ports, additionally supplies a busy signal to said port of any other of said initiator devices requesting said connection.

9. The interface switching system of claim 8, wherein each of said ports has an ID, wherein each of said devices has a LUN, wherein said requests of said initiator devices identifies a specific one of said target device s or ports, and wherein said controller additionally comprises a table, said table having an entry for each of said target devices, said entry indicating the port ID and LUN of said target device, said entry updated by said controller to indicate the port ID of the one of said initiator devices interconnected to said singular target bus under a request for said target device of said entry, otherwise said entry is updated by said controller to indicate said target device is free.

10. The interface switching system of claim 9, wherein said initiator devices may Reserve or have a Contingent Allegiance with one of said target devices, and wherein said controller additionally updates said table entry for each said target device to indicate the port ID of the one of said initiator devices Reserving said target device, or having a Contingent Allegiance therewith, said controller additionally posting said Reserved or Contingent Allegiance in said entry.

11. The interface switching system of claim 9, wherein said initiator devices may queue additional transactions at said target devices, said additional transaction requiring interconnection between said queuing initiator device and said target device, and wherein said controller additionally updates said table entry for each said target device to indicate the port ID of the one of said initiator devices queuing said target device, said controller additionally posting said queuing in said entry.

12. The interface switching system of claim 9, wherein said initiator device ports comprise a plurality of lines, and wherein each said analog switch comprises a ganged group of FET switchable transistor circuits, one for each line of said initiator device ports, each said FET switchable transistor circuit switchable between an open condition and a closed condition coupling to said singular target bus.

13. A method for interconnecting Small Computer System Interface (SCSI) ports coupling devices having differing priorities including a highest priority (initiator) and lower priorities (targets), comprising the steps of:
arranging said lower priority target device ports on a singular bus;
responding to requests for connection from said initiator devices for arbitrating amongst said initiator devices; and
operating analog switches to interconnect only one of said initiator device ports to said singular target bus.

14. The method of claim 13, comprising the additional step, during said operation of said analog switches to interconnect one of said initiator device ports, of supplying a busy signal to said port of any other of said initiator devices requesting said connection.

15. The method of claim 14, wherein each of said ports has an ID, wherein each of said devices has a LUN, wherein said requests of said initiator devices identifies a specific one of said target devices or ports, and wherein said responding step additionally comprises updating an entry in a table for said identified target device, said table having an entry for each of said target devices, said entry indicating the port ID and LUN of said target device, said updating of said entry to indicate the port ID of the one of said initiator devices interconnected to said singular target bus under a request for said target device of said entry, otherwise said entry is updated to indicate said target device is free.

16. The method of claim 15, wherein said initiator devices may Reserve or have a Contingent Allegiance with one of said target devices, and wherein said updating step additionally updates said table entry for each said target device to indicate the port ID of the one of said initiator devices Reserving said target device, or having a Contingent Allegiance therewith, and additionally posting said Reserved or Contingent Allegiance in said entry.

17. The method of claim 15, wherein said initiator devices may queue additional transactions at said target devices, said additional transaction requiring interconnection between said queuing initiator device and said target device, and wherein said updating step additionally updates said table entry for each said target device to indicate the port ID of the one of said initiator devices queuing said target device, and additionally posting said queuing in said entry.

\* \* \* \* \*